US012657456B2

(12) United States Patent
Joo et al.

(10) Patent No.: US 12,657,456 B2
(45) Date of Patent: Jun. 16, 2026

(54) ELECTRONIC DEVICE FOR PROVIDING A NEURAL NETWORK AND OPERATION METHOD THEREOF

(71) Applicant: SAMSUNG ELECTRONICS CO., LTD., Suwon-si (KR)

(72) Inventors: Sunwoong Joo, Suwon-si (KR); Benjamin Rufus Duckworth, Middlesex (GB); Martyn Gregory Bliss, Middlesex (GB); Simyung Chang, Suwon-si (KR); Cheulhee Hahm, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1022 days.

(21) Appl. No.: 17/719,660

(22) Filed: Apr. 13, 2022

(65) Prior Publication Data

US 2022/0237460 A1 Jul. 28, 2022

Related U.S. Application Data

(63) Continuation of application No. PCT/KR2020/011131, filed on Aug. 20, 2020.

(30) Foreign Application Priority Data

Oct. 17, 2019 (KR) ........................ 10-2019-0129342

(51) Int. Cl.
*G06N 3/08* (2023.01)
*G06N 3/045* (2023.01)

(52) U.S. Cl.
CPC ............... *G06N 3/08* (2013.01); *G06N 3/045* (2023.01)

(58) Field of Classification Search
CPC .......... G06N 3/045; G06N 3/08; G06N 3/082; G06N 3/063
See application file for complete search history.

(56) References Cited

U.S. PATENT DOCUMENTS 10,157,045 B2 12/2018 Venkataramani et al.
2016/0358070 A1* 12/2016 Brothers ................ G06N 3/045
(Continued)

FOREIGN PATENT DOCUMENTS

KR 10-2019-0098107 8/2019
KR 20190098107 A * 8/2019 ............... G06N 3/08
WO 2019/108923 A1 6/2019

OTHER PUBLICATIONS

Jin, Haifeng et al., Auto-Keras: An Efficient Neural Architecture Search System, Jul. 25, 2019, KDD '19: Proceedings of the 25th ACM SIGKDD International Conference on Knowledge Discovery & Data Mining, p. 1949 (Year: 2019).*
(Continued)

*Primary Examiner* — Jennifer N Welch
(74) *Attorney, Agent, or Firm* — STAAS & HALSEY LLP

(57) ABSTRACT

An electronic device according to an embodiment includes: a memory storing one or more instructions; and a processor configured to execute the one or more instructions stored in the memory. The processor is configured to: receive information about a limitation, wherein the information about the limitation includes information about a target device for realizing a neural network; generate a plurality of candidate neural networks based on the information about the limitation; generate a plurality of codes for realizing the plurality of candidate neural networks in the target device, based on the information about the limitation and a pre-determined cost function; obtain performance index information corresponding to each of the plurality of codes; and provide the
(Continued)

plurality of candidate neural networks and the plurality of codes corresponding to the plurality of candidate neural networks, respectively, based on the performance index information.

11 Claims, 8 Drawing Sheets

(56)                    References Cited

U.S. PATENT DOCUMENTS

| | | | |
|---|---|---|---|
| 2017/0068889 | A1 * | 3/2017 | Fougner ................ G06F 9/4843 |
| 2018/0336453 | A1 * | 11/2018 | Merity ................... G06N 3/044 |
| 2019/0180170 | A1 * | 6/2019 | Huang ................... G06F 3/061 |
| 2019/0266234 | A1 | 8/2019 | Ormerod |
| 2019/0362005 | A1 * | 11/2019 | Sen ................... G06F 16/24532 |
| 2020/0364553 | A1 * | 11/2020 | Amos ...................... G06N 3/08 |
| 2022/0178899 | A1 * | 6/2022 | Brooks ................. G06Q 50/04 |

OTHER PUBLICATIONS

Zhou, Hongpeng et al., BayesNAS: A Bayesian Approach for Neural Architecture Search, Jun. 7, 2019, Proceedings of the 36th International Conference on Machine Learning, Jun. 2019 publication, p. 6 (Year: 2019).*

Sun et al, ("Design Candidate Identification Using Neural Netwrok-Based Fuzzy Reasoning", Elsvier, 2000, pp. 383-396).*

Written Opinion of the International Searching Authority dated Nov. 25, 2020 in International Patent Application No. PCT/KR2020/011131 (10 pages, 7 pages English Translation).

Barret Zoph et al., "Neural Architecture Search with Reinforcement Learning" Google Brain; Feb. 15, 2017; arXiv:1611.01578v2 (16 pages).

Barret Zoph et al., "Learning Transferable Architectures for Scalable Image Recognition" Google Brain; dated Apr. 11, 2018; arXiv:1707.07012v4 (14 pages).

Han Cai et al., "ProxylessNAS: Direct Neural Architecture Search on Target Task and Hardware" Massachusetts Institute of Technology; Feb. 23, 2019; arXiv:1812.00332v2 (13 pages).

Tianqi Chen et al., "TVM: An Automated End-to-End Optimizing Compiler for Deep Learning" Oct. 8-10, 2018, Carlsbad CA; USENIX Association; 13th USENIX Symposium on Operating Design and Implementation (pp. 179-594).

Tianqi Chen et al., "Learning to Optimize Tensor Programs" Paul G. Allen School of Computer Science & Engineering, University of Washington; Jan. 8, 2019; arXiv:1805.08166v4 (16 pages).

"MnasNet: Towards Automating the Design of Mobile Machine Learning Models" Google AI Blog; Posted by Mingxing Tan; Aug. 7, 2018 (4 pages).

Korean Office Action dated Mar. 10, 2026 for KR Patent Application No. 10-2019-0129342.

* cited by examiner

Figure 2:
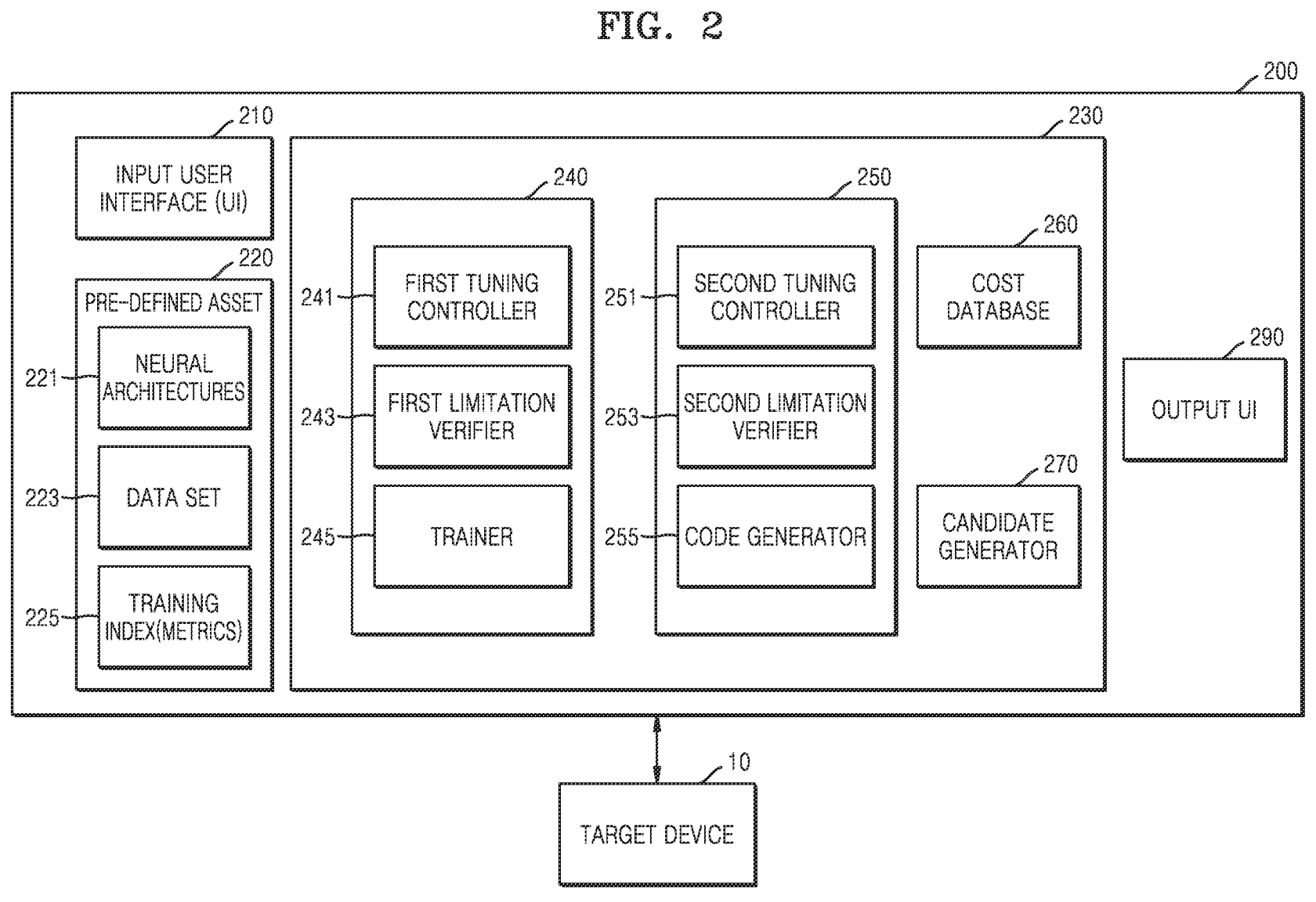

INPUT USER INTERFACE (UI)    210

PRE-DEFINED ASSET    220

NEURAL ARCHITECTURES    221

DATA SET    223

TRAINING INDEX(METRICS)    225

230

240

FIRST TUNING CONTROLLER    241

FIRST LIMITATION VERIFIER    243

TRAINER    245

250

SECOND TUNING CONTROLLER    251

SECOND LIMITATION VERIFIER    253

CODE GENERATOR    255

COST DATABASE    260

CANDIDATE GENERATOR    270

OUTPUT UI    290

TARGET DEVICE    10

1

ELECTRONIC DEVICE FOR PROVIDING A NEURAL NETWORK AND OPERATION METHOD THEREOF

CROSS-REFERENCE TO RELATED APPLICATION

This application is a continuation application, under 35 U.S.C. § 111(a), of international application No. PCT/KR2020/011131, filed on Aug. 20, 2020, which is claims priority under 35 U. S. C. § 119 to Korean Patent Application No. 10-2019-0129342 filed on Oct. 17, 2019, the disclosure of each of which is incorporated herein by reference in its entirety.

BACKGROUND

Field

Various embodiments relate to an electronic device and an operating method thereof, and more particularly, to an electronic device for providing a neural network and a code for executing the neural network and an operating method of the electronic device.

Description of Related Art

Recently, researches using neural networks have expanded their scope to the fields of optimization and automatic structuralization of neural networks from increasing the inference accuracy of image, video, and natural language-based tasks. A neural architecture search (NAS) refers to a technique for automatically designing an optimized neural architecture through training, rather than directly designing individual neural architectures via a human being.

A neural architecture constituting a neural network is composed of one or more layers each having a unique function, and the function of each layer is performed by using an operator. Here, a tensor program corresponding to a realization algorithm in the operator is not generally considered when a neural network is designed. Rather, separately from the designing of the neural network, a tensor program for realizing a trained neural network is searched for.

Meanwhile, with respect to the distribution of the trained neural network to various target devices, even when the same neural network is distributed, resources consumed in an actual operation are dependent on a realization method of an operation library previously provided in the target devices.

SUMMARY

An electronic device for providing a neural network according to an embodiment includes: a memory storing one or more instructions; and a processor configured to execute the one or more instructions stored in the memory to: receive information about a limitation, wherein the information about the limitation includes information about a target device for realizing the neural network; generate a plurality of candidate neural networks based on the information about the limitation; generate a plurality of codes for realizing the plurality of candidate neural networks to be executed in the target device, based on the information about the limitation and a pre-determined cost function; obtain performance index information corresponding to each of the plurality of codes; and provide the plurality of candidate neural networks and the plurality of codes corresponding to the plurality of candidate neural networks, respectively, based on the performance index information.

The information about the target device may include information about at least one of a type of a processor of the target device which is configured to execute the neural network in the target device, an occupation rate of the processor of the target device, an initialization time, an execution time, a type of a memory of the target device, an occupation rate of the memory of the target device, and an amount of power consumption.

The information about the limitation may include information about at least one of a type of the neural network, a data set configured to train the neural network, and a training index.

The electronic device may further include a display, and the display may be configured to display a user interface screen configured to allow setting of the limitation.

The processor may further be configured to: generate a first neural architecture; verify whether the first neural architecture is able to satisfy the limitation, and when the first neural architecture is able to satisfy the limitation, train the first neural architecture and determine a first weight value with respect to the first neural architecture; measure an assessment index corresponding to the generated first neural architecture and the first weight value. The processor may further be configured to: generate a second neural architecture altered from the first neural architecture so as to maximize the assessment index; and verify whether the second neural architecture is able to satisfy the limitation, and when the second neural architecture is able to satisfy the limitation, train the second neural architecture and determine a second weight value with respect to the second neural architecture. The plurality of candidate neural networks may include a first neural network including the first neural architecture and the first weight value, and a second neural network including the second neural architecture and the second weight value.

The processor may further be configured to: determine whether information associated with a cost with respect to each of a plurality of layers included in the first neural network is pre-stored; based on information associated with a cost with respect to a first layer from among the plurality of layers determined as being stored, obtain performance index information with respect to the first neural network; and determine a tensor program and a code, with respect to a second layer from among the plurality of layers, with respect to which the cost is not stored, and based on the determined code, obtain the performance index information with respect to the first neural network.

The performance index information may include performance index information measured by executing each of the plurality of codes in the target device.

The performance index information may be among a plurality of performance indexes, and the plurality of performance indexes may include at least one of an initialization time of a corresponding code, an execution time of the corresponding code, a memory cost required for executing the corresponding code, and an amount of power consumption required for executing the corresponding code.

The pre-determined cost function may be defined by a weight summation of a plurality of performance indexes.

The pre-determined cost function may include a weight summation of an initialization time of the code and an execution time of a corresponding code, and the processor may further be configured to: when the corresponding code executes repetitive inferences, determine a second weight value with respect to the execution time of the corresponding code to be greater than a first weight value with respect to the initialization time of the corresponding code; and when the corresponding code executes one-time inference, determine the second weight value with respect to the execution time of the corresponding code to be less than the first weight value with respect to the initialization time of the corresponding code.

The electronic device may further include a display. The processor may further be configured to determine a priority order of the plurality of candidate neural networks based on the performance index information and the pre-determined cost function, and the display may be configured to display the plurality of candidate neural networks and the plurality of codes corresponding to the plurality of candidate neural networks, respectively, by aligning the plurality of candidate neural networks and the plurality of codes corresponding to the candidate neural networks, respectively, according to the priority order of the plurality of candidate neural networks.

An operating method of an electronic device for providing a neural network according to an embodiment includes: receiving information about a limitation, wherein the information about the limitation includes information about a target device for realizing the neural network; generating a plurality of candidate neural networks based on the information about the limitation; generating a plurality of codes for realizing the plurality of candidate neural networks in the target device, based on the information about the limitation and a pre-determined cost function; obtaining performance index information corresponding to each of the plurality of codes; and providing the plurality of candidate neural networks and the plurality of codes corresponding to the plurality of candidate neural networks, respectively, based on the performance index information.

BRIEF DESCRIPTION OF DRAWINGS

The above and other objects, features and advantages of the present disclosure will become more apparent to those of ordinary skill in the art by describing in detail exemplary embodiments thereof with reference to the accompanying drawings, in which:

FIG. 2 is a diagram showing an electronic device providing a neural network and a code, according to an embodiment.

DETAILED DESCRIPTION OF EXEMPLARY EMBODIMENTS

Figure 1:
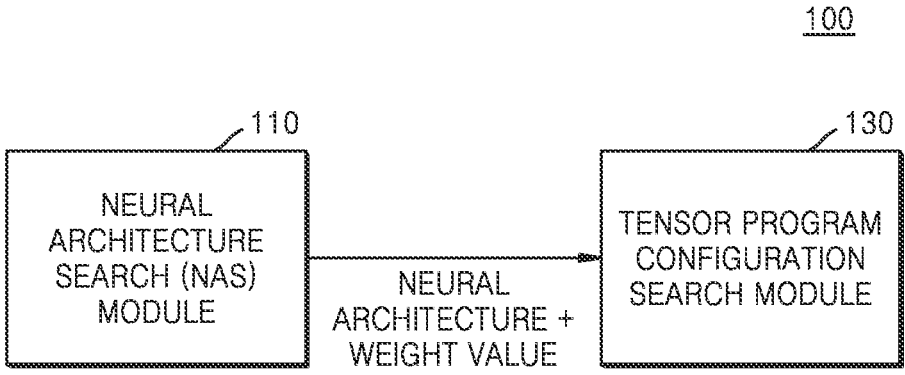
FIG. 1 is a diagram showing a search system providing a neural network and a code, according to an embodiment.

The terms used herein will be briefly described and then the present disclosure will be described in detail.

In the present disclosure, general terms that have been widely used nowadays are selected, when possible, in consideration of functions of the disclosure, but non-general terms may be selected according to the intentions of technicians in the this art, precedents, or new technologies, etc. Some terms may be arbitrarily chosen by the present applicant. In this case, the meanings of these terms will be explained in corresponding parts of the disclosure in detail. Thus, the terms used herein should be defined not based on the names thereof but based on the meanings thereof and the whole context of the disclosure.

Throughout the specification, it will be understood that when an element is referred to as "including" another element, the element may further include other elements unless mentioned otherwise. Also, the terms, such as "unit" or "module," used in the specification, should be understood as a unit that processes at least one function or operation and that may be embodied in a hardware manner, a software manner, or a combination of the hardware manner and the software manner.

The term "user" in the embodiments of the present specification denotes a viewer viewing an image displayed on an electronic device or a person controlling a function or an operation of the electronic device, and may include an operator or an installation technician.

Hereinafter, embodiments of the disclosure will be described in detail with reference to the accompanying drawings, so that the embodiments of the disclosure may be easily implemented by one of ordinary skill in the art. However, the disclosure may have different forms and should not be construed as being limited to the embodiments described herein. Also, in the drawings, parts not related to descriptions are omitted for the clear description of the disclosure, and throughout the specification, like reference numerals are used for like elements.

According to various embodiments, provided are an electronic device for automatically generating optimized candidate neural networks and codes corresponding to the candidate neural networks by considering a target device for executing a neural network and an operating method of the electronic device.

An electronic device according to an embodiment may prevent exclusion of a neural architecture including a layer of a non-general configuration, from a candidate neural network, regardless of the accuracy, in a neural architecture search (NAS).

An electronic device according to an embodiment may prevent execution of optimization, biased for one type of performance index, by defining a cost function via a weighted summation of a plurality of performance indexes, when a tensor program is optimized.

An electronic device according to an embodiment may appropriately optimize a neural network and a code according to whether or not the neural network executes one-time inference or repetitive inferences.

FIG. 1 is a diagram showing a search system providing a neural network and a code, according to an embodiment.

Referring to FIG. 1, a search system 100 may include a neural architecture search (NAS) module 110 and a tensor program configuration search module 130. The NAS module 110 may search an optimized neural network through an NAS. For example, the NAS module 110 may include: an RNN controller configured to predict values of elements for determining a neural architecture, for example, a filter size of each convolution layer, a stride, etc.; and a trainer configured to train a neural network composed of the values output by the RNN controller by using a data set. The NAS module 110 may use an accuracy measured in a neural network trained by the trainer as a reward and use a reinforcement training for training the RNN controller again, to search for the optimized neural network. Here, the neural network may be a concept including a neural architecture and a neural network weight. The neural network weight may be a connection intensity of the neural network and may be an object that is modified and refined by training.

With respect to the optimized neural network searched by the NAS module 110, the tensor program configuration search module 130 may search for a tensor program realizing a function (for example, an operator or a function) performed in each of a plurality of layers included in the neural network. The tensor program configuration search module 130 may search for an optimized tensor program for a target device to execute the neural network, through a tensor program configuration search.

The NAS module 110 and the tensor program configuration search module 130 of FIG. 1 may be configured in separate devices from each other.

The system 100 according to an embodiment may distribute the trained neural network to the target device. For example, the system 100 may distribute the trained neural network in the form of a data file including the neural architecture and the neural network weight or in the form of a neural network compiler including an optimized code in the neural network. However, the system 100 is not limited thereto.

In general, when a neural architecture is searched for, an algorithm (for example, the tensor program) for realizing, in a target device, a function of each layer included in a neural network to be searched is not considered. However, the neural network is executed in the target device, and resources consumed in actual neural network operations are dependent upon a realization method (a configuration) of the tensor program, such as an operation library previously provided in the target device. Thus, a neural network that is searched without taking into account resources which may be supported by the target device may have reduced efficiency, when actually executed in the target device.

FIG. 2 is a diagram showing an electronic device for providing a neural network and a code, according to an embodiment.

Referring to FIG. 2, an electronic device 200 may include an input user interface 210, a pre-defined asset 220, a neural network optimization module 230, and an output user interface 290. Also, the neural network optimization module 230 may include an NAS module 240, a tensor program configuration search module 250, a cost data base 260, and a candidate generator 270.

The electronic device 200 may receive, through the input user interface 210, a limitation assigned by a user to an NAS and a tensor program configuration search. The limitation according to an embodiment may include a type of a neural network, an architecture of a neural network, a data set for training the neural network, a training index (metrics), target device information, etc. but is not limited thereto.

Also, the electronic device 200 may include the pre-defined asset 220, and the pre-defined asset 220 may include a neural architecture 221, a data set 223, and a training index (metrics) 225. For example, the electronic device 200 may pre-store architectures with respect to a classification neural network, a detection neural network, a segmentation neural network, and an image translation neural network based on functions of the neural networks. Alternatively, architectures (for example, MobileNet, ResNet, etc.) with respect to well-known neural networks may be pre-stored.

Also, the electronic device 200 may pre-store a plurality of data sets appropriate for the type of the neural network and training indexes for training the neural networks. For example, in the case of the classification neural network, the training index may include a Top-5 accuracy, a Top-1 accuracy, etc. The Top-5 accuracy is an index indicating whether or not a correct answer is in any of 5 categories having the highest probability, and the Top-1 accuracy is an index indicating whether or not a correct answer is in one category having the highest probability.

When the user sets the limitation, the electronic device 200 may control the setting such that the user may easily set the limitation by using the pre-defined asset 220.

When the limitations are set, and the NAS is started, a first tuning controller 241 included in the neural network optimization module 240 may generate a new neural architecture based on the set limitation. For example, when a type of neural architecture is configured based on the limitation, the first tuning controller 241 may use the corresponding neural architecture as a backbone and generate a neural architecture altered in terms of the number of layers, the number of channels, a size of a filter, a size of a stride, etc.

With respect to the generated neural architecture, a first limitation verifier 243 may perform verification on a verifiable limitation, before training the neural architecture. When the first limitation verifier 243 determines that the generated neural architecture is not able to satisfy the limitation, the first tuning controller 241 may generate a new neural architecture by altering again the neural network architecture.

In contrast, when the first limitation verifier 243 determines that the generated neural architecture is able to satisfy the limitation, the trainer 245 may train the neural architecture to satisfy the training index that is set in the limitation. The trainer 245 may feed-back an assessment index measured in the trained neural network, to the first tuning controller 241, and thus, a neural network (a neural architecture and a weight value) to maximize the assessment index may be searched for, and a plurality of optimized candidate neural networks may be searched.

When the neural network optimization module 240 searches the plurality of candidate neural networks, a second tuning controller 251 of the tensor program optimization module 250 may generate a tensor program for executing each of the plurality of candidate neural networks in a target device 10.

Also, a second limitation verifier 253 may verify whether or not the generated tensor program is able to satisfy the limitation.

When the generated tensor program is not able to satisfy the limitation, the second tuning controller 251 may generate a new tensor program by altering the tensor program.

In contrast, when the tensor program is able to satisfy the limitation, a code generator 255 may compile the tensor program to generate a code.

Alternatively, the second limitation verifier 253 may verify the limitation with respect to the generated code, rather than the tensor program.

The generated code may be transmitted to the target device 10 and may be executed by the target device 10, and performance index information may be measured. Here, the performance index information may include a plurality of performance indexes, and the plurality of performance indexes may include at least one of an initialization time of the code in the target device, an execution time of the code, a memory cost required for executing the code, and the amount of power consumption required for executing the code.

A pre-determined cost function may be calculated by using the performance index information, and the second tuning controller 251, the second limitation verifier 253, and the code generator 255 may search for the optimized tensor program and code with an aim of minimizing the pre-determined cost function.

Also, the cost data base 260 may be updated based on the performance index information of the optimized tensor program and code.

The cost data base 260 may store a cost with respect to a configuration of each of a plurality of layers included in the neural network. For example, the cost with respect to a function (an operator) performing a specific function in the target device 10 may be included.

The candidate generator 270 may store a predetermined number of candidate neural networks and codes from among the generated plurality of candidate neural networks and codes and may display the predetermined number of candidate neural networks and codes on the output user interface 290. Here, the candidate generator 270 may determine a priority order with respect to the plurality of candidate neural networks and codes, based on the pre-determined cost function, an execution time, a memory cost (the amount of memory use), and the amount of power consumption. The candidate generator 270 may display the plurality of candidate neural networks on the output user interface 290 by aligning the plurality of candidate neural networks based on the priority order. This aspect will be described in detail below with reference to FIG. 7.

Figure 3:
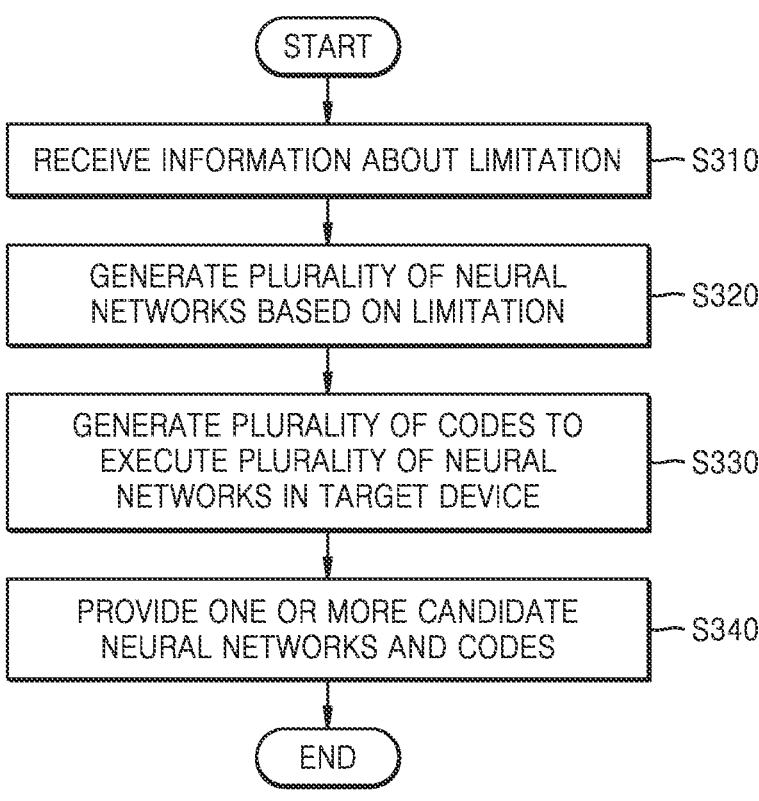
FIG. 3 is a flowchart showing an operating method of an electronic device, according to an embodiment.

FIG. 3 is a flowchart showing an operating method of an electronic device, according to an embodiment.

Referring to FIG. 3, the electronic device 200 according to an embodiment may receive information about a limitation for an NAS and a tensor program configuration search (S310).

The limitation according to an embodiment may include a type of a neural network, a neural architecture, a data set for training the neural network, a training index, target device information, etc. but is not limited thereto.

The electronic device 200 may display a user interface screen on which the limitation may be set and may receive, through the user interface screen, a user input of the limitation. This aspect is described in detail below with reference to FIG. 4.

Figure 4:
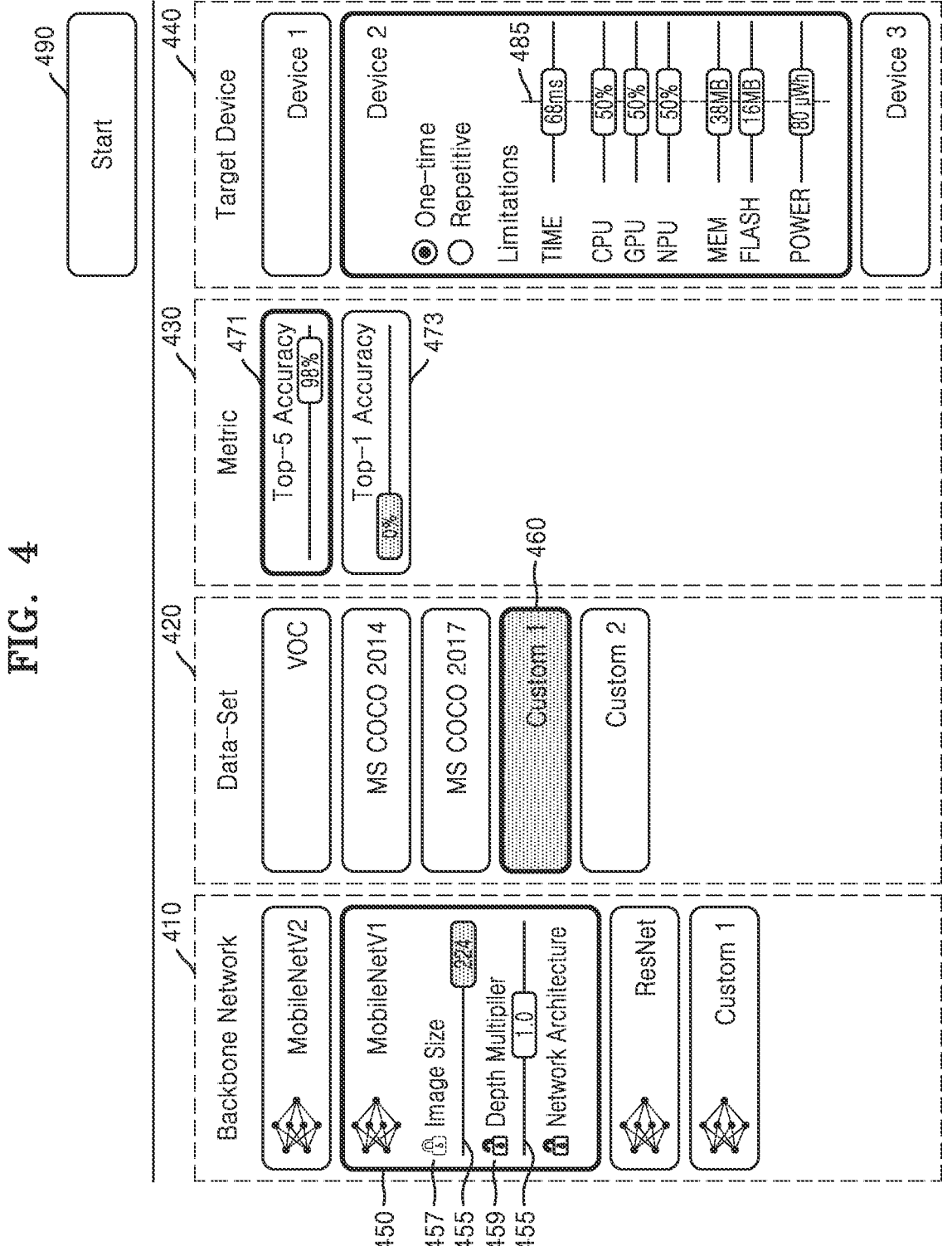
FIG. 4 is a diagram showing an example of a user interface screen displayed by an electronic device to receive an input of a limitation, according to an embodiment.

FIG. 4 is a diagram showing an example of a user interface screen displayed by an electronic device to receive an input of a limitation, according to an embodiment.

Referring to FIG. 4, the user interface screen may include a first menu item 410 to set a limitation with respect to a neural architecture, a second menu item 420 to set a limitation with respect to a data set, a third menu item 430 to set a limitation with respect to a training index, and a fourth menu item 440 to set a limitation with respect to a target device.

The first menu item 410 may display a type of the neural architecture. Here, the type of the neural architecture may include neural architectures included in the pre-defined asset 220 described with reference to FIG. 2. For example, the electronic device 200 may display the architectures with respect to the classification neural network, the detection neural network, the segmentation neural network, and the image translation neural network according to the functions of the neural networks. Alternatively, the electronic device 200 may display the architectures (for example, MobileNet, ResNet, etc.) with respect to the well-known neural networks or may display neural architectures defined by a user.

When displaying the type of the neural architecture, a thumbnail image indicating a corresponding neural architecture may be displayed together, and brief information indicating the characteristics of a corresponding neural network may be displayed together.

When a user input of selecting MobileNetV1 is received through the first menu item 410, the electronic device 200 may set the neural architecture to be searched as the MobileNetV1. For example, the electronic device 200 may use the MobileNetV1 as a backbone and may search for the neural architecture by altering the MobileNetV1. Also, when the MobileNetV1 is selected, a lower menu item 450 may be displayed. The lower menu item 450 may include items to set an image size, the number of channels of the neural network, and other conditions.

The lower menu item 450 may include a slider 455 to set a specific numeral value of each of limitations or may include an input window through which a user may directly input a numerical value. However, it is not limited thereto.

For example, with respect to the image size, when the image size is set as "224" and locked 457 through the slider, the electronic device 200 may not change the image size while searching for the neural architecture. Here, the image size may be the limitation.

Also, with respect to the number of channels of the neural network, when unlocked is set 459, the electronic device 200 may search for the neural architecture by changing the number of channels of the neural network.

The second menu item 420 may display a type of the data set. Here, the type of the data set may include data sets included in the pre-defined asset 220 described with reference to FIG. 2. Alternatively, data sets directly input by a user or received from an external device may be displayed.

Some data sets may be displayed as an inactive state 460 based on a neural architecture selected through the first menu item 410. For example, with respect to a data set that is not appropriate for the selected neural architecture, the data set may be displayed as an inactive state so as not to be selected by a user or may not be displayed through the second menu item 420.

The third menu item 430 may display a type of the training index. Here, the type of the training index may include training indexes included in the pre-defined asset 220 described with reference to FIG. 2. Alternatively, a user may directly set a loss function, instead of the training indexes.

Also, with respect to a training index that is not appropriate for the neural architecture selected through the first menu item 410, the training index may be displayed as an inactive state or may not be displayed through the third menu item.

When the neural architecture selected through the first menu item 410 is a classification neural architecture, a Top-5 inference accuracy 471 and a Top-1 inference accuracy 473 that are appropriate for the classification neural architecture may be displayed through the third menu item 430. The electronic device 200 may set the Top-5 inference accuracy 471 as the training index, based on a user input, and may set an accuracy (for example, 98%) together. FIG. 4 illustrates that only the Top-5 inference accuracy 471 is set as the training index, and the Top-1 inference accuracy 473 is not set. However, according to an embodiment, a plurality of training indexes may be simultaneously set.

The fourth menu item 440 may display a type of the target device.

When the target device is selected, the electronic device 200 may include items to set: whether to execute one-time inference or repetitive inferences by using a neural network in the target device; limitations with respect to a processor included in the target device (for example, a type of the processor to be used to execute the neural network, an occupation rate, etc.); an execution time (an inference time) of the neural network; an initialization time; and limitations with respect to a memory (for example, a type of the memory to be used to execute the neural network, an occupation rate, etc.).

With respect to a neural network selected through the first menu item 410, when a corresponding target device has measured performance index information, the electronic device 200 may display, for the user, the measured performance index information as a default value 485. Accordingly, the user may easily set the limitation with respect to the performance index information.

FIG. 4 illustrates that the first through fourth menu items 410, 420, 430, and 440 are displayed on the same screen. However, it is not limited thereto. The first through fourth menu items 410 through 440 may be separately displayed on separate screens.

The electronic device 200 may set the limitations based on the user inputs with respect to the first through fourth menu items 410 through 440 and may start an NAS based on a user input selecting a start item 490.

Referring to FIG. 3 again, the electronic device 200 may generate a plurality of neural networks based on the set limitation (S320). This aspect is described in detail with reference to FIG. 5.

Figure 5:
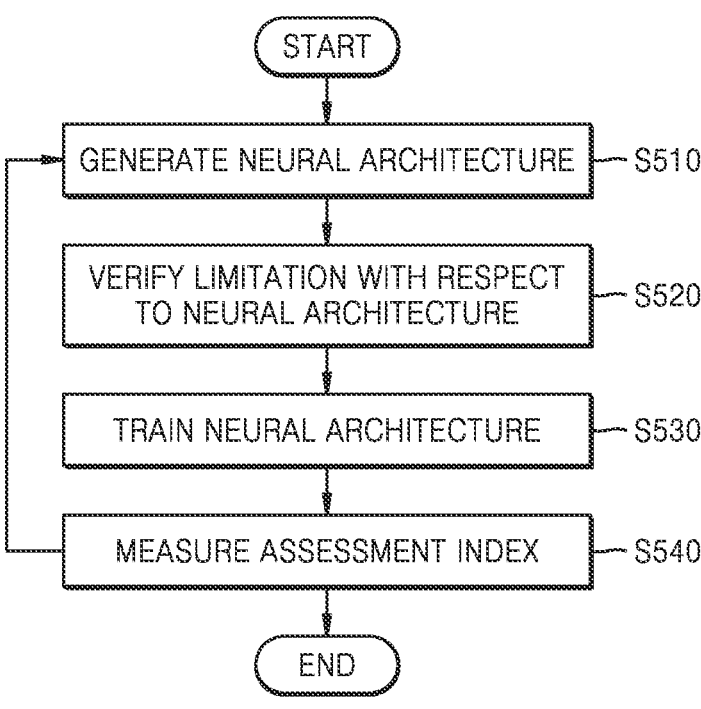
FIG. 5 is a flowchart showing in detail operation S320 of FIG. 3, according to an embodiment.

FIG. 5 is a flowchart showing operation S320 of FIG. 3 in detail.

Referring to FIG. 5, the electronic device 200 may generate a neural architecture according to the set limitation (S510). For example, when a type of the neural architecture is set as "MobileNetV1," the electronic device 200 may use the "MobileNetV1" as a backbone and generate a neural architecture by altering the "MobileNetV1" with respect to the number of layers, the number of channels, a size of a filter, a size of a stride, etc.

With respect to the generated neural architecture, the electronic device 200 may perform verification on a verifiable limitation, before training the neural architecture (S520).

For example, when the generated neural architecture is not able to satisfy an initialization time and an execution time of the neural network, the amount of use of the processor, the amount of use of the memory, etc. that are set as the limitations, the electronic device 200 may not train the generated neural architecture and may generate a new neural architecture by altering the generated neural architecture.

In contrast, when the generated neural architecture is able to satisfy the set limitation, the electronic device 200 may train the generated neural architecture (S530).

Here, the electronic device 200 may train the neural architecture to satisfy a training index that is set in the limitation. The electronic device 200 may measure an assessment index of the trained neural network (S540) and may determine optimized neural architectures and weight values by maximizing the assessment index by repeating operations S510 through S540.

Referring to FIG. 3 again, the electronic device 200 according to an embodiment may generate a plurality of codes for executing a plurality of neural networks generated in operation S320 in a target device (S330). The electronic device 200 may generate the plurality of codes, based on the set limitation. This aspect is described in detail with reference to FIG. 6.

Figure 6:
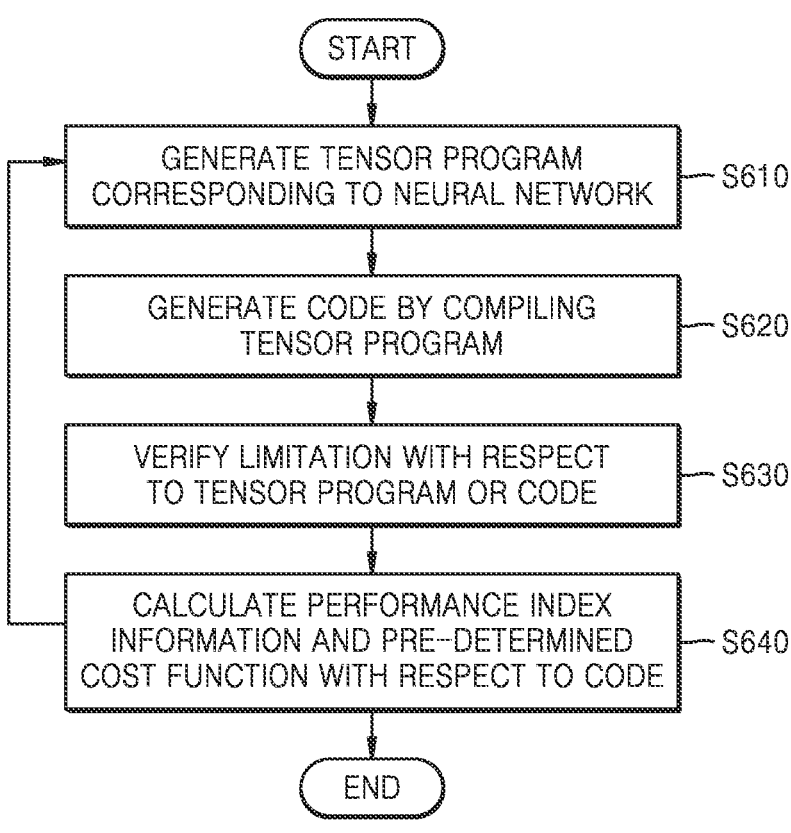
FIG. 6 is a flowchart showing in detail operation S330 of FIG. 3, according to an embodiment.

FIG. 6 is a flowchart showing operation S330 of FIG. 3 in detail.

Referring to FIG. 6, the electronic device 200 may generate a tensor program for executing each of the plurality of neural networks in the target device (S610).

The tensor program may denote an algorithm for realizing a function (for example, an operator) executing a function of each of a plurality of layers included in the neural network.

The electronic device 200 may generate a code by compiling the generated tensor program (S620). The code may denote a tensor program translated in a machine code or intermediate representation (IR).

With respect to the generated tensor program or code, the electronic device 200 may execute a pre-examination with respect to a verifiable limitation, before executing the generated tensor program or code in the target device (S630).

For example, when the generated tensor program or code is not able to satisfy the limitation, the electronic device 200 may not compile the generated tensor program or execute the code in the target device and may alter the tensor program to generate a new tensor program.

In contrast, when the generated tensor program or code is able to satisfy the set limitation, the electronic device 200 may compile the generated program as a code or execute the generated code in the target device.

The electronic device 200 may obtain performance index information with respect to the code (S640). For example, the electronic device 200 may transmit the code to the target device 10, and the target device 10 may execute the code and transmit measured performance index information to the electronic device 200.

Here, the performance index information may include a plurality of performance indexes, and the plurality of performance indexes may include at least one of an initialization time of the code in the target device, an execution time of the code, a memory cost required for executing the code, and the amount of power consumption required for executing the code.

The electronic device 200 may calculate a pre-determined cost function by using the performance index information. The electronic device 200 may search for an optimized tensor program and code by minimizing the pre-determined cost function by repeating operations S610 through S640.

Here, the pre-determined cost function may be defined by a weight summation of the plurality of performance indexes. For example, the pre-determined cost function may be defined as the following equation 1.

$$\underset{s \in S_e}{\arg\min} \{ \omega_{init} \cdot f_{init}(g(e, s)) + \qquad\qquad [\text{Equation 1}]$$
$$\omega_{run} \cdot f_{run}(g(e, s)) + \omega_{mem} \cdot f_{mem}(g(e, s)) + \ldots \}$$

Here, $f_{init}(g)$ denotes an initialization cost (time) in the target device, $f_{run}(g)$ denotes an execution cost (time) in the target device, and $f_{mem}(g)$ denotes a memory cost in the target device. Each of $w_{init}$, $w_{run}$, and $w_{mem}$ indicates a weight value with respect to a corresponding cost.

For example, when a corresponding code executes one-time inference (when the limitation is set as to mainly execute one-time inference), the weight values $w_{init}$ and $w_{run}$ may be set to be the same. Alternatively, when the corresponding code executes repetitive inferences, the weight value $w_{run}$ may be set to be greater than the weight value $w_{init}$. However, it is not limited thereto.

As described above, by defining the cost function by the weight summation of the plurality of performance indexes, the cost function may not be biased for one type of performance index, and the optimized tensor program and code may be searched for by comprehensively taking into account the plurality of performance indexes.

With respect to a plurality of candidate neural networks, the electronic device 200 may search for an optimized tensor program and code, and a plurality of codes corresponding to the plurality of candidate neural networks may be generated.

The electronic device 200 may update a cost data base based on performance index information of the optimized tensor program and code.

Referring to FIG. 3 again, the electronic device 200 may provide a plurality of candidate neural networks and codes corresponding to the plurality of candidate neural networks, respectively, based on performance index information or a pre-determined cost function with respect to each of the plurality of codes (S340).

For example, the electronic device 200 may determine a priority order of the plurality of candidate neural networks, based on the pre-determined cost functions of the codes respectively corresponding to the plurality of candidate neural networks. As the pre-determined cost function decreases, the priority order of the code may increase.

Also, the electronic device 200 may determine the priority order of the plurality of candidate neural networks based on the performance index information of the plurality of codes. For example, the priority order of the plurality of codes may be determined based on execution times with respect to the plurality of codes. Alternatively, the priority order of the plurality of codes may be determined based on memory costs required for executing the plurality of codes, and the priority order of the plurality of codes may be determined based on the amount of power consumption required for executing the plurality of codes. However, it is not limited thereto.

Figure 7:
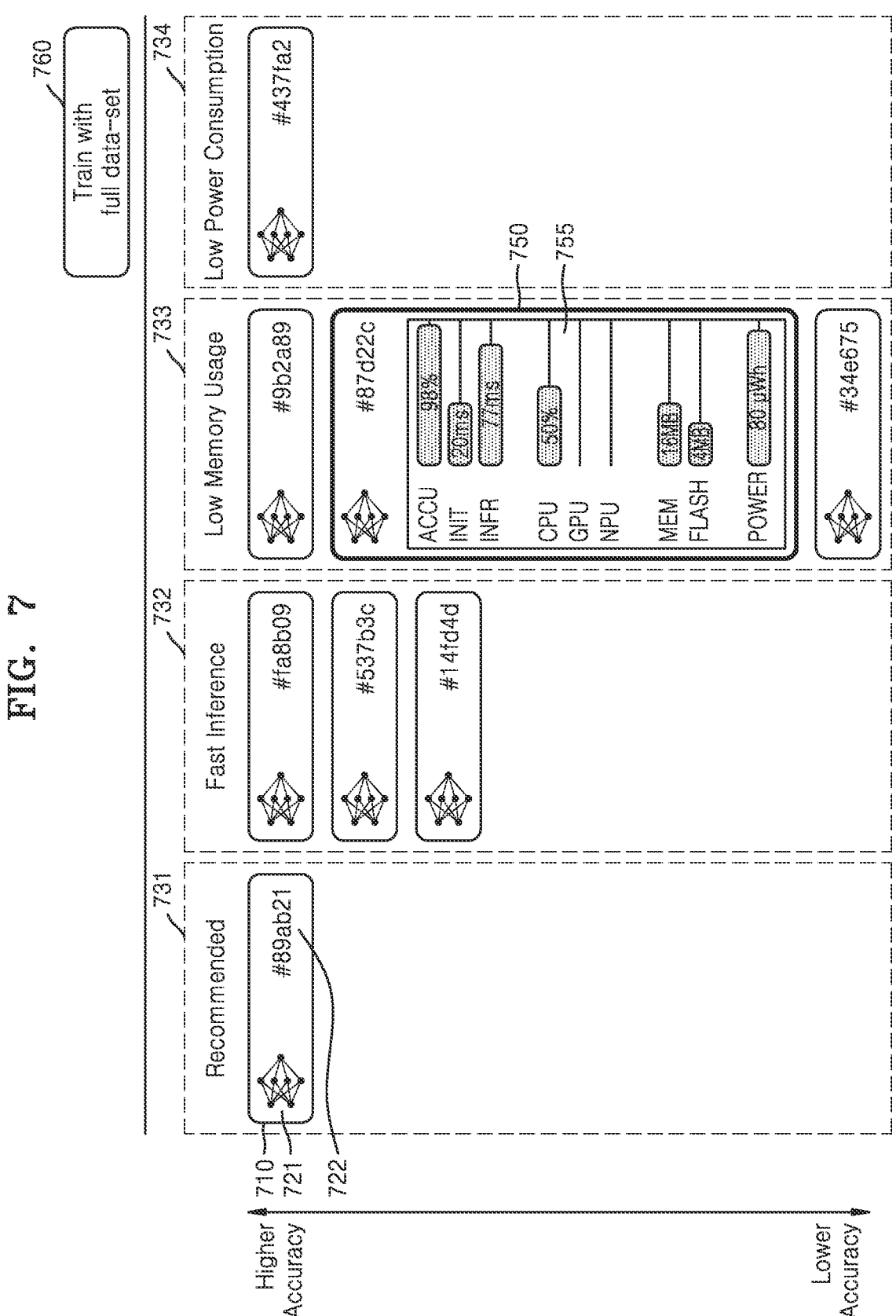
FIG. 7 is a diagram showing an example of a user interface screen displayed by an electronic device to display candidate neural networks and codes, according to an embodiment.

FIG. 7 is a diagram showing an example of a user interface screen displayed by an electronic device to display candidate neural networks and codes.

Referring to FIG. 7, the user interface screen may display the plurality of candidate neural networks through a candidate neural network item 710 corresponding to each of the candidate neural networks.

The candidate neural network item 710 may include a thumbnail image 721 with respect to the candidate neural network and code information 722 corresponding to the candidate neural network. Here, the thumbnail image 721 may be an image indicating a neural architecture of the candidate neural network, and the code information 722 may be identification ID for identifying the code. However, it is not limited thereto.

The electronic device 200 may display a plurality of candidate neural network items by aligning the plurality of candidate neural network items according to predetermined criteria. The electronic device 200 may display the plurality of candidate neural networks by aligning the plurality of candidate neural networks according to a value of the pre-determined cost function, an execution time, the amount of memory use, and the amount of power consumption.

For example, the electronic device 200 may provide a candidate neural network having a least pre-determined cost function from among the plurality of candidate neural networks, as a recommended neural network. The electronic device 200 may display the recommended neural network in a first area 731.

Also, the electronic device 200 may determine the priority order of the plurality of candidate neural networks based on the execution time and may assign a higher priority order to a neural network as the time for executing (the inference time) the neural network decreases. The electronic device 200 may align and display, in a second area 732, the plurality of candidate neural networks according to the priority order assigned based on the execution time.

Also, the electronic device 200 may determine the priority order of the plurality of candidate neural networks based on the amount of memory use and may assign a higher priority order to a neural network as the amount of memory use required for executing the neural network decreases. The electronic device 200 may align and display, in a third area 733, the plurality of candidate neural networks according to the priority order assigned based on the amount of memory use.

Also, the electronic device 200 may determine the priority order of the plurality of candidate neural networks based on the amount of power consumption and may assign a higher priority order to a neural network as the amount of power consumption required for executing the neural network decreases. The electronic device 200 may align and display, in a fourth area 734, the plurality of candidate neural networks according to the priority order assigned based on the amount of power consumption.

The alignment criteria illustrated in FIG. 7 are only examples, and the disclosure is not limited thereto. The electronic device 200 according to an embodiment may align and display the plurality of candidate neural networks according to other criteria except for the alignment criteria illustrated and described with reference to FIG. 7.

When an input of selecting a candidate neural network item displayed on the user interface screen of FIG. 7 is received, the electronic device 200 may display performance index information corresponding to the selected candidate neural network item. For example, as illustrated in FIG. 7, when a candidate neural network item 750 is selected, performance index information 755 with respect to a candidate neural network and a code #87d22c corresponding to the selected candidate neural network item 750 may be displayed. Here, the performance index information 755 with respect to the selected candidate neural network may be performance index information that is measured when the selected candidate neural network is executed in a target device by using the code #87d22c and may include at least one of an initialization time of the code #87d22c in the target device, an execution time of the code #87d22c, a memory cost required for executing the code #87d22c, and the amount of power consumption required for executing the code #87d22c.

Accordingly, a user may select the candidate neural network item on the user interface screen and may easily identify the performance index information with respect to the candidate neural network and the code.

Also, the user interface screen may include a full data set training item 760. The plurality of candidate neural networks according to an embodiment may be neural networks trained by using some data sets for fast training.

When, after any one of the plurality of candidate neural network items displayed on the user interface screen is selected, the full data set training item 760 is selected, the electronic device 200 may train a candidate neural network corresponding to the selected candidate neural network item, by using the full data set stored in the electronic device. Here, the full data set may be a data set included in the pre-defined asset 220 described with reference to FIG. 2 but is not limited thereto.

Figure 8:
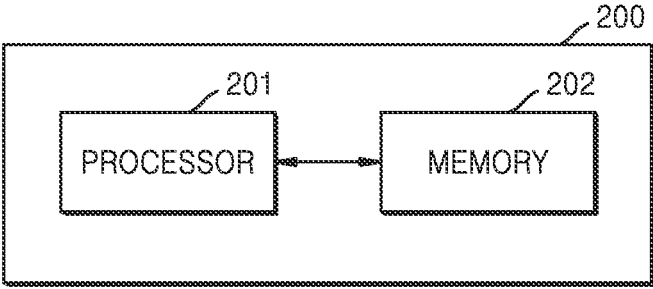
FIG. 8 is a block diagram showing components of an electronic device according to an embodiment.

FIG. 8 is a block diagram showing components of an electronic device according to an embodiment.

Referring to FIG. 8, the electronic device 200 according to an embodiment may include a processor 201 and a memory 202.

The processor 201 according to an embodiment may generally control operations of the electronic device 200. Also, the processor 201 may control other components included in the electronic device 200 to perform predetermined operations.

The processor 201 according to an embodiment may execute one or more programs stored in the memory 202. The processor 201 may include a single core, a dual core, a triple core, a quad core, or a multiple core. Also, the processor 201 may include a plurality of processors.

The memory 202 according to an embodiment may store various data, programs or applications for operating and controlling the electronic device 200. Also, the programs stored in the memory 202 may include one or more instructions. The programs (the one or more instructions) or the applications stored in the memory 202 may be executed by the processor 201.

The memory 202 according to an embodiment may include the pre-defined asset 220, the NAS module 240, the tensor program configuration search model 250, and the cost data base 260 illustrated and described with reference to FIG. 2. Here, the NAS module 240 and the tensor program configuration search model 250 may be realized in the form of software for performing an NAS function and a tensor program search function. The processor 201 may perform each of the functions by using this software stored in the memory.

The processor 201 according to an embodiment may receive information about a limitation for the NAS and the tensor program configuration search, set the limitation, and generate a plurality of candidate neural networks and codes according to the set limitation.

For example, the processor 201 may generate a neural architecture according to the limitation, train the neural architecture, and determine a weight value with respect to the neural architecture, to search for an optimized neural network. Also, the processor 201 may determine a tensor program for executing a plurality of searched candidate neural networks in a target device. The processor 201 may determine an optimized tensor program based on the limitation and a pre-determined cost function. Here, the pre-determined cost function may be defined by a weight summation of a plurality of performance indexes. Thus, an optimized tensor program and code may be determined by comprehensively taking into account an initialization time of a code, an execution time of the code, a memory cost, etc. when executing the code in the target device.

Figure 9:
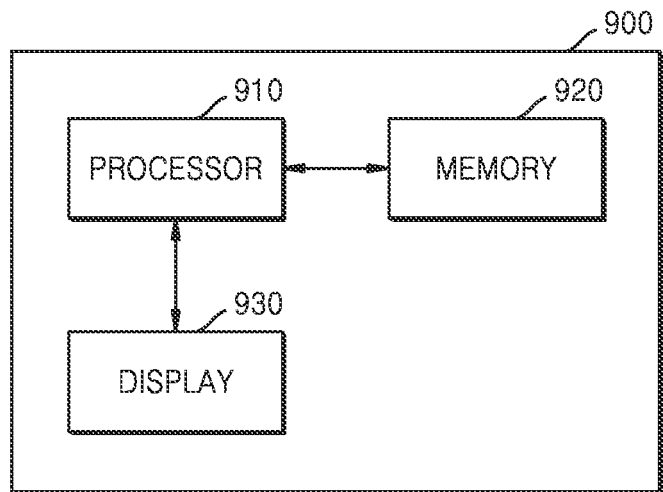
FIG. 9 is a block diagram showing components of an electronic device according to another embodiment.

FIG. 9 is a block diagram showing components of an electronic device according to another embodiment.

An electronic device 900 of FIG. 9 may be an embodiment of the electronic device 100 described with reference to FIGS. 1 through 8.

Referring to FIG. 9, the electronic device 900 according to an embodiment may include a processor 910, a memory 920, and a display 930.

The processor 910 of FIG. 9 may correspond to the processor 201 of FIG. 8, and the memory 920 of FIG. 9 may correspond to the memory 202 of FIG. 8, and thus, the same descriptions are omitted.

The display 930 may generate a driving signal by converting an image signal, a data signal, an on screen display (OSD) signal, a control signal, etc. processed by the processor 910. The display 930 may be realized as a plasma display (PDP), a liquid crystal display (LCD), an organic light-emitting display (OLED), a flexible display, etc. and may also be realized as a three-dimensional (3D) display. Also, the display 930 may be configured as a touch screen and may be used as an input device as well as an output device.

For example, the display 930 may correspond to the input user interface and the output user interface of FIG. 2. The display 930 may display the user interface screen illustrated and described with reference to FIG. 4 and the user interface screen illustrated and described with reference to FIG. 7.

FIGS. 8 and 9 illustrate the block diagrams of the electronic devices 200 and 900, respectively, according to embodiments. Each component of the block diagrams may be integrated, added, or omitted according to the specification of the electronic devices 200 and 900 that are actually realized. That is, two or more components may be integrated into one component, or one component may be divided into two or more components, according to necessity. Also, functions executed in each block are disclosed to describe the embodiments, and their specific operations or devices do not limit the scope of the present disclosure.

The operating method of the electronic device according to an embodiment may be realized in the form of a program command which may be executed by various computing devices and may be recorded on a computer-readable medium. The computer-readable recording medium may include program commands, data files, data structures, or a combination thereof. The program commands recorded on the computer-readable recording medium may be specially designed and constructed for the inventive concept or may be known to and usable by one of ordinary skill in a field of computer software. Examples of the computer-readable medium include storage media such as magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program commands (e.g., ROMs, RAMs, or flash memories). Examples of the program commands include a high-level language code that may be executed by a computer using an interpreter as well as a machine language code made by a complier.

Also, the operating method of the electronic device according to the embodiments may be included in a computer program product. The computer program product may be purchased as a product between a seller and a purchaser.

The computer program product may include a software (S/W) program or a computer-readable storage medium in which the S/W program is stored. For example, the computer program product may include a product in the form of an S/W program (for example, a downloadable application) that is electronically distributed through a manufacturer of an electronic device or an electronic market (for example, a Google play store or an App store). For electronic distribution, at least a portion of the S/W program may be stored in a storage medium or temporarily generated. In this case, the storage medium may include a server of the manufacturer, a server of the electronic market, or a storage medium of a broadcasting server temporarily storing the S/W program.

In a system including a server and a client device, the computer program product may include a storage medium of the server and a storage medium of the client device. Alternatively, when there is a third device (for example, a smartphone) connected to the server or the client device for communication, the computer program product may include a storage medium of the third device. Alternatively, the computer program product may directly include an S/W program transmitted from the server to the client device or the third device or transmitted from the third device to the client device.

In this case, any one of the server, the client device, and the third device may perform the method according to the embodiments by executing the computer program product. Alternatively, at least two of the server, the client device, and the third device may perform the method according to the embodiments by executing the computer program product in a distributed fashion.

For example, the server (for example, a cloud server or an AI server) may execute a computer program product stored in the server to control the client device connected to the server for communication to perform the methods according to the embodiments.

While the disclosure has been particularly shown and described with reference to example embodiments thereof, it will be understood by one of ordinary skill in the art that various changes in form and details may be made therein without departing from the spirit and scope of the disclosure as defined by the following claims.

What is claimed is:

1. An electronic device for providing a neural network, the electronic device comprising:

a memory to store one or more instructions; and a processor configured to execute the one or more instructions stored in the memory to:

receive information about a limitation including information about a target device for realizing the neural network, wherein the information about the target device includes information about at least one of a type of a processor of the target device which is configured to realize the neural network, an occupation rate of the processor of the target device, an initialization time, an execution time, a type of a memory of the target device, an occupation rate of the memory of the target device, and an amount of power consumption;

generate a plurality of candidate neural networks based on the information about the limitation including the information about the target device;

generate a plurality of codes for realizing the plurality of candidate neural networks in the target device, based on the information about the limitation and a pre-determined cost function determined based on a plurality of performance indexes;

obtain performance index information among a plurality of performance indexes measured by executing each of the plurality of codes in the target device, the plurality of performance indexes including at least one of an initialization time of a corresponding code, an execution time of the corresponding code, a memory cost required for executing the corresponding code, and an amount of power consumption required for executing the corresponding code; and provide the plurality of candidate neural networks and the plurality of codes corresponding to the plurality of candidate neural networks, respectively, based on the performance index information.

2. The electronic device of claim 1, wherein the information about the limitation includes information about at least one of a type of the neural network, a data set configured to train the neural network, and a training index.

3. The electronic device of claim 1, further comprising a display, wherein the display is configured to display a user interface screen configured to allow setting of the limitation.

4. The electronic device of claim 1, wherein the processor is further configured to:

generate a first neural architecture;

verify whether the first neural architecture is able to satisfy the limitation, and when the first neural architecture is able to satisfy the limitation, train the first neural architecture and determine a first weight value with respect to the first neural architecture;

measure an assessment index corresponding to the generated first neural architecture and the first weight value;

generate a second neural architecture altered from the first neural architecture so as to maximize the assessment index; and verify whether the second neural architecture is able to satisfy the limitation, and when the second neural architecture is able to satisfy the limitation, train the second neural architecture and determine a second weight value with respect to the second neural architecture, and wherein the plurality of candidate neural networks include a first neural network including the first neural architecture and the first weight value, and a second neural network including the second neural architecture and the second weight value.

5. The electronic device of claim 4, wherein the processor is further configured to:

determine whether information associated with a cost with respect to each of a plurality of layers included in the first neural network is pre-stored;

based on information associated with a cost with respect to a first layer from among the plurality of layers determined as being stored, obtain performance index information with respect to the first neural network; and determine a tensor program and a code, with respect to a second layer from among the plurality of layers, with respect to which the cost is not stored, and obtain the performance index information with respect to the first neural network based on the determined code.

6. The electronic device of claim 1, wherein the pre-determined cost function is defined by a weight summation of the plurality of performance indexes.

7. The electronic device of claim 6, wherein the pre-determined cost function includes a weight summation of an initialization time of a corresponding code and an execution time of the corresponding code, and the processor is further configured to:

when the corresponding code executes repetitive inferences, determine a second weight value with respect to the execution time of the corresponding code to be greater than a first weight value with respect to the initialization time of the corresponding code; and when the corresponding code executes one-time inference, determine the second weight value with respect to the execution time of the corresponding code to be less than the first weight value with respect to the initialization time of the corresponding code.

8. The electronic device of claim 1, further comprising a display, wherein the processor is further configured to determine a priority order of the plurality of candidate neural networks based on the performance index information and the pre-determined cost function, and the display is configured to display the plurality of candidate neural networks and the plurality of codes corresponding to the plurality of candidate neural networks, respectively, by aligning the plurality of candidate neural networks and the plurality of codes corresponding to the plurality of candidate neural networks, respectively, according to the priority order of the plurality of candidate neural networks.

9. An operating method of an electronic device for providing a neural network, the operating method comprising:

receiving information about a limitation including information about a target device for realizing the neural network, wherein the information about the target device includes information about at least one of a type of a processor of the target device which is configured to realize the neural network, an occupation rate of the processor of the target device, an initialization time, an execution time, a type of a memory of the target device, an occupation rate of the memory of the target device, and an amount of power consumption;

generating a plurality of candidate neural networks based on the information about the limitation including the information about the target device;

generating a plurality of codes for realizing the plurality of candidate neural networks in the target device, based on the information about the limitation and a pre-determined cost function determined based on a plurality of performance indexes;

obtaining performance index information among a plurality of performance indexes measured by executing each of the plurality of codes in the target device, the plurality of performance indexes including at least one of an initialization time of a corresponding code, an execution time of the corresponding code, a memory cost required for executing the corresponding code, and an amount of power consumption required for executing the corresponding code; and providing the plurality of candidate neural networks and the plurality of codes corresponding to the plurality of candidate neural networks, respectively, based on the performance index information.

10. The operating method of claim 9, wherein the receiving of the information about the limitation includes receiving information about at least one of a type of the neural network, a data set configured to train the neural network, and a training index.

11. A non-transitory recording medium that is readable by one or more computers and has recorded thereon a program for executing the method of claim 9.

\* \* \* \* \*